(12) United States Patent
Bai et al.

(10) Patent No.: US 12,120,604 B2
(45) Date of Patent: *Oct. 15, 2024

(54) CROSS-NODE DEEP LEARNING METHODS OF SELECTING MACHINE LEARNING MODULES IN WIRELESS COMMUNICATION SYSTEMS

(71) Applicant: QUALCOMM Incorporated, San Diego, CA (US)

(72) Inventors: Tianyang Bai, Mountain View, CA (US); Hua Wang, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,761

(22) Filed: Oct. 27, 2023

(65) Prior Publication Data

US 2024/0129844 A1 Apr. 18, 2024

Related U.S. Application Data

(63) Continuation of application No. 17/166,814, filed on Feb. 3, 2021, now Pat. No. 11,838,857.

(51) Int. Cl.
*H04W 48/18* (2009.01)
*G06N 3/045* (2023.01)
*G06N 20/20* (2019.01)

(52) U.S. Cl.
CPC ............ *H04W 48/18* (2013.01); *G06N 3/045* (2023.01); *G06N 20/20* (2019.01)

(58) Field of Classification Search
CPC ..... H04W 48/18; H04W 88/02; H04W 88/08; H04W 24/02; G06N 3/045; G06N 20/20; G06N 3/044; G06N 3/048; G06N 3/084
USPC .......................................................... 370/329
See application file for complete search history.

(56) References Cited

U.S. PATENT DOCUMENTS

| 2017/0012692 | A1* | 1/2017 | Kim ...................... H04B 7/063 |
| 2017/0357893 | A1 | 12/2017 | Dexter et al. |
| 2019/0086988 | A1* | 3/2019 | He ........................ G06F 1/3212 |
| 2019/0182683 | A1* | 6/2019 | Khirallah .............. H04W 16/28 |
| 2020/0012966 | A1 | 1/2020 | Nagaraju et al. |
| 2020/0184380 | A1 | 6/2020 | Thomas et al. |

(Continued)

OTHER PUBLICATIONS

Eugenio M.C.M., et al., "Machine Learning for 5G/B5G Mobile and Wireless Communications: Potential, Limitations, and Future Directions", IEEE Access, vol. 7, Sep. 30, 2019 (Sep. 30, 2019), pp. 137184-137206, XP011748413, DOI: 10.1109/ACCESS.2019. 2942390 [Retrieved on Sep. 30, 2019] paragraph I paragraph II.

(Continued)

*Primary Examiner* — Huy C Ho
(74) *Attorney, Agent, or Firm* — Arun Swain

(57) ABSTRACT

A method of wireless communication is performed by a user equipment (UE). The method receives, from a network, a configuration for a decision making module. The method also executes the decision making module to determine a selection parameter for a configuration of at least one machine learning module. The method selects the configuration of the at least one machine learning module based on the selection parameter. Further, the method reports, to the network, a decision resulting from executing the decision making module.

20 Claims, 9 Drawing Sheets

(56) References Cited

U.S. PATENT DOCUMENTS

2022/0107815 A1 4/2022 Neumann
2022/0248312 A1 8/2022 Bai et al.

OTHER PUBLICATIONS

International Search Report and Written Opinion—PCT/US2021/062463—ISA/EPO—Apr. 13, 2022.

* cited by examiner

CROSS-NODE DEEP LEARNING METHODS OF SELECTING MACHINE LEARNING MODULES IN WIRELESS COMMUNICATION SYSTEMS

CROSS-REFERENCE TO RELATED APPLICATION

The present application is a continuation application of U.S. patent application Ser. No. 17/166,814, filed on Feb. 3, 2021, and titled "CROSS-NODE DEEP LEARNING METHODS OF SELECTING MACHINE LEARNING MODULES IN WIRELESS COMMUNICATION SYSTEMS," the disclosure of which is expressly incorporated by reference in its entirety.

FIELD OF THE DISCLOSURE

Aspects of the present disclosure generally relate to wireless communications, and more particularly to techniques and apparatuses for cross-node deep learning methods of selecting machine learning (ML) modules in wireless communication systems.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In one aspect of the present disclosure, a method of wireless communication by a user equipment (UE) includes receiving, from a network, a configuration for a decision making module. The method further includes executing the decision making module to determine a selection parameter for a configuration of at least one machine learning module. The method still further includes selecting the configuration of the at least one machine learning module based on the selection parameter. The method also includes reporting, to the network, a decision resulting from executing the decision making module.

Another aspect of the present disclosure is directed to an apparatus for a UE for wireless communication. The apparatus has a memory and one or more processors coupled to the memory. The processor(s) is configured to receive, from a network, a configuration for a decision making module. The processor(s) is further configured to execute the decision making module to determine a selection parameter for a configuration of at least one machine learning module. The processor(s) is still further configured to select the configuration of the at least one machine learning module based on the selection parameter. The processor(s) is also configured to report, to the network, a decision resulting from executing the decision making module.

In one aspect of the present disclosure, a method of wireless communication by a network device includes transmitting, to a user equipment (UE), a configuration for a decision making module. The method further includes receiving, from the UE, a decision resulting from the UE executing the decision making module. The method still further includes transmitting, to the UE, signaling based on the decision received from the UE.

Another aspect of the present disclosure is directed to an apparatus for a network device for wireless communication. The apparatus has a memory and one or more processors coupled to the memory. The processor(s) is configured to transmit, to a user equipment (UE), a configuration for a decision making module. The processor(s) is further configured to receive, from the UE, a decision resulting from the UE executing the decision making module. The processor(s) is still further configured to transmit, to the UE, signaling based on the decision received from the UE.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
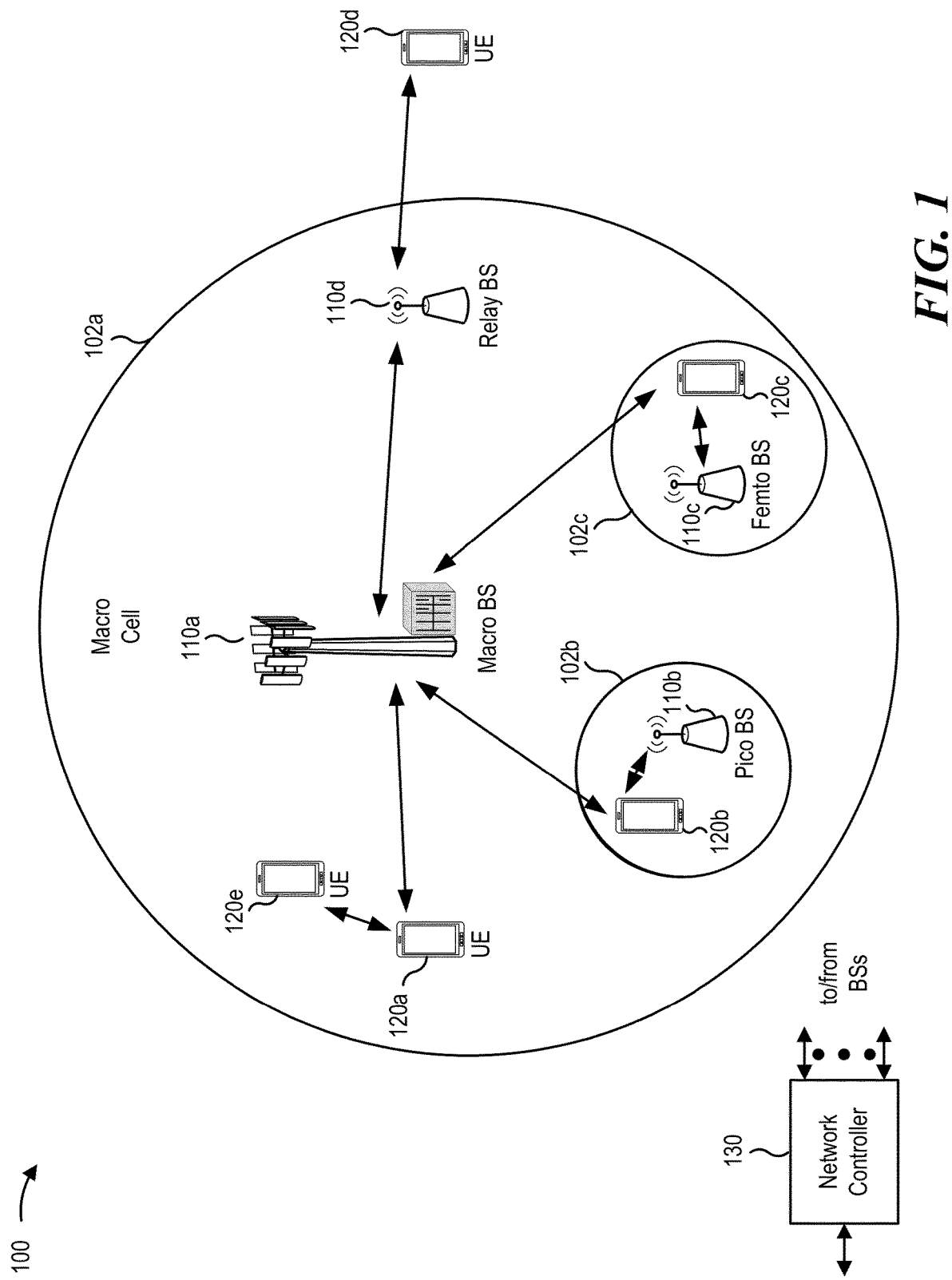
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Machine learning modules may be implemented to assist communication functions. For example, machine learning techniques may improve channel prediction and decoding with non-linear impairments. Certain machine learning modules may be implemented on wireless devices, and specify over-the-air signals as input. For example, a machine learning module may provide accurate positioning based on radio frequency (RF) sensing and/or a positioning reference signal (PRS).

In future wireless systems, devices, such as user equipment (UE), may run different machine learning modules for different tasks or purposes. The machine learning module(s) at the user equipment may be configured by the network. A machine learning module or a specific configuration of machine learning modules may have a finite range of applicable scenarios. For example, machine learning modules may only work well in scenarios matching the training data sets. To handle different scenarios, user equipment may need different machine learning modules or configurations for a specific task.

An issue with existing systems is that user equipment need to know how to select the appropriate machine learning module and when to update the machine learning configuration. User equipment may be configured with a band (or set) of different machine learning modules, and should know when to select the appropriate module to use.

According to aspects of the present disclosure, the network may configure a decision making module at a UE to control the parameters and/or selection of the machine learning modules at the UE. The network configures the decision making module, in addition to configuring the machine learning modules at the UE.

The network configures the decision making module to assist the UE to select or adapt machine learning modules. That is, the network transmits to the UE an algorithm or parameters for the algorithm. The input of the decision making module may depend on the network sending reference signals, signaling, and/or configurations.

According to aspects of the present disclosure, the UE runs the decision making module locally, and reports to the network each decision output from the decision making module. As a result, the network may send to the UE a new machine learning module or updated machine learning parameters based on receiving the decision report. The network may benefit from knowing the decision of which machine learning module the user equipment is using, as different machine learning modules may specify different network configurations or actions. For example, a different configuration of reference signals may be transmitted based on the feedback from the UE.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
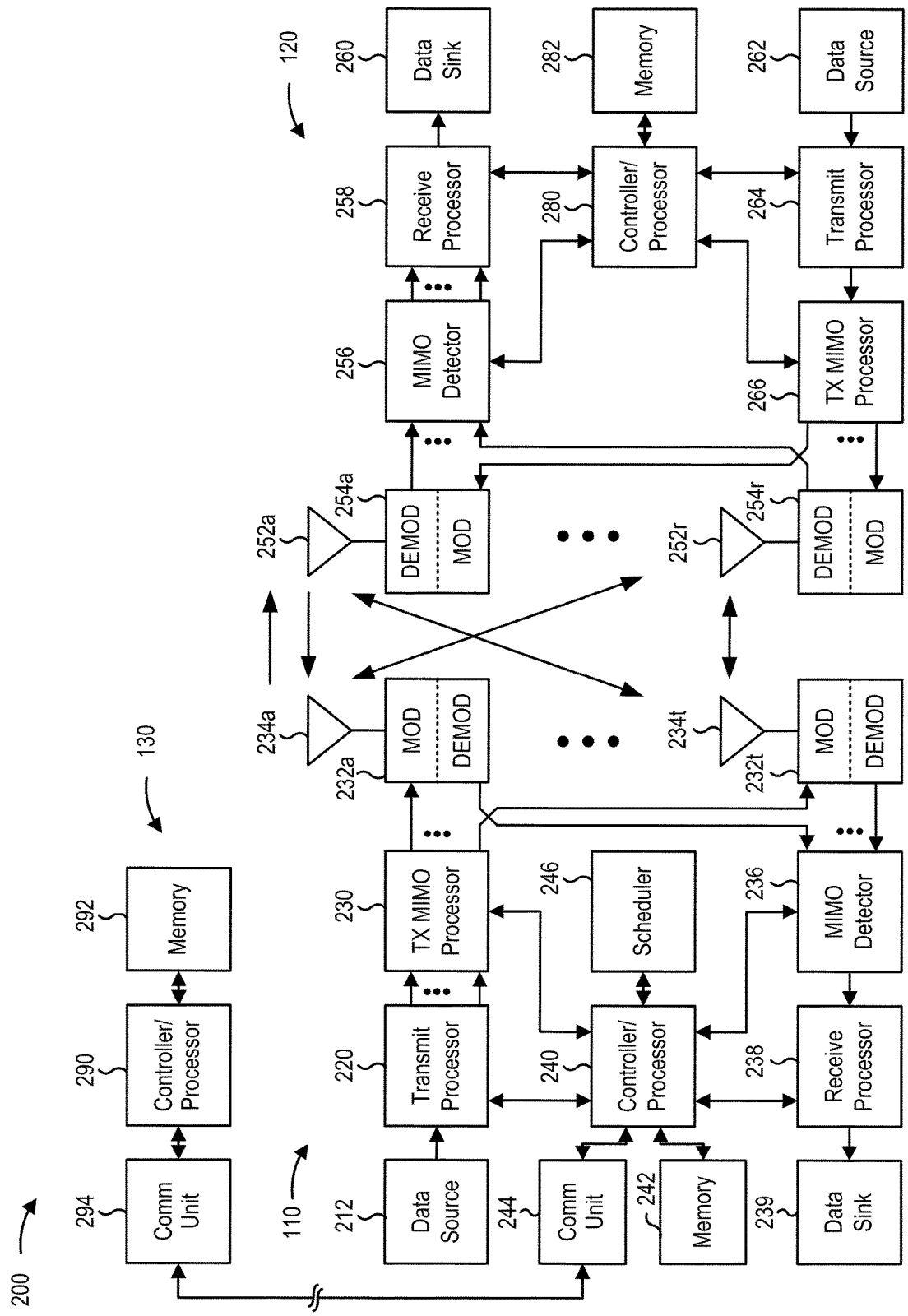
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with the decision making module, as described in more detail elsewhere. For example, the controller/processor 240 of the base station 110, the controller/processor 280 of the UE 120, and/or any other component(s) of FIG. 2 may perform or direct operations of, for example, the processes of FIGS. 5-7 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for executing a decision making module, means for selecting, and means for reporting. In some aspects, the base station 110 may include means for receiving, means for transmitting, means for training, and means for requesting. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable lowlatency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
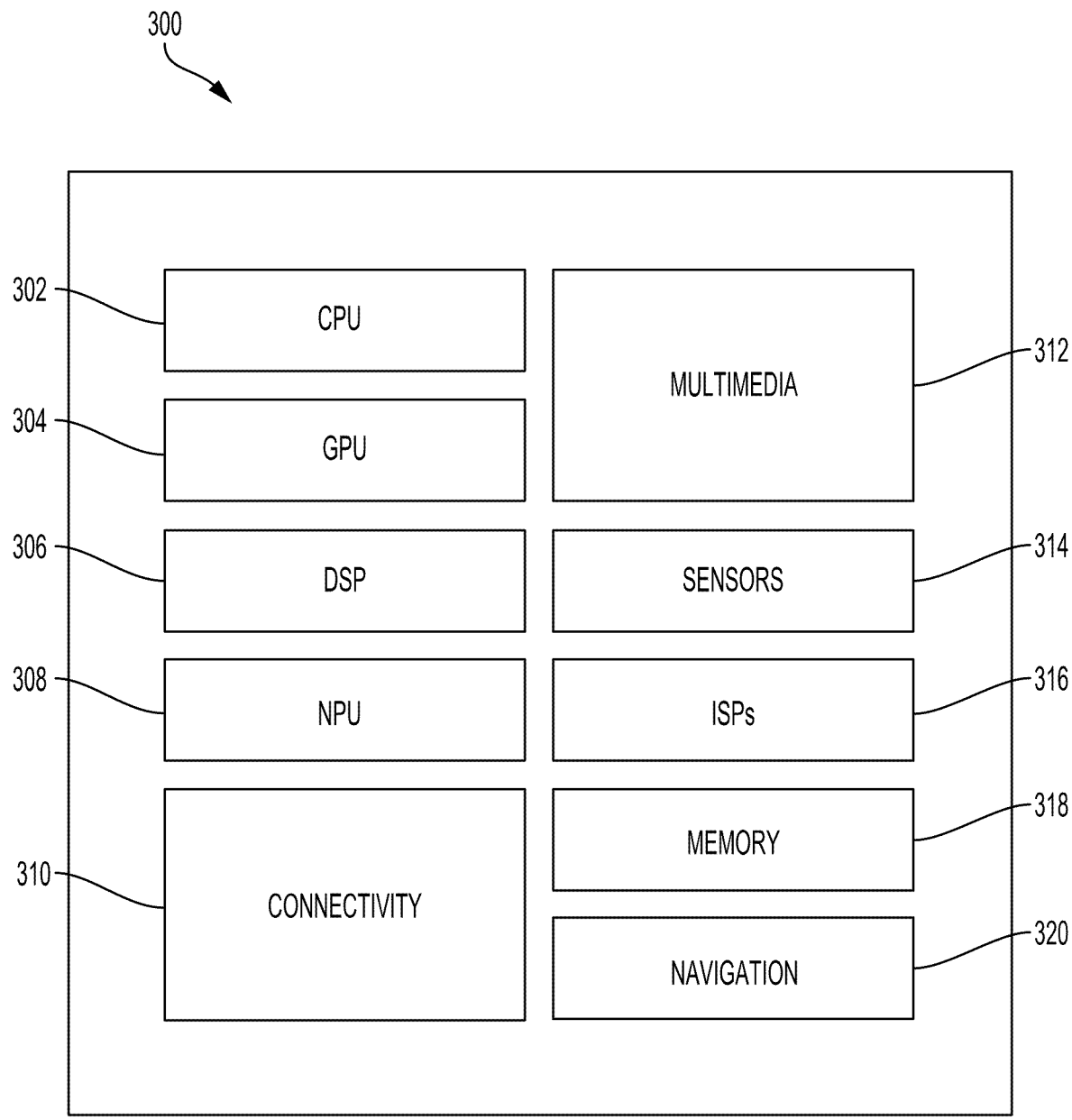
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for the decision making module, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive, from a network, a configuration for a decision making module; to execute the decision making module to determine a selection parameter for a configuration of at least one machine learning module; to select the configuration of the at least one machine learning module based on the selection parameter; and to report, to the network, a decision resulting from executing the decision making module. The instructions loaded into the general-purpose processor 302 may also comprise code to transmit, to a user equipment (UE), a configuration for a decision making module; to receive, from the UE, a decision resulting from the UE executing the decision making module; and to transmit, to the UE, signaling based on the decision received from the UE.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
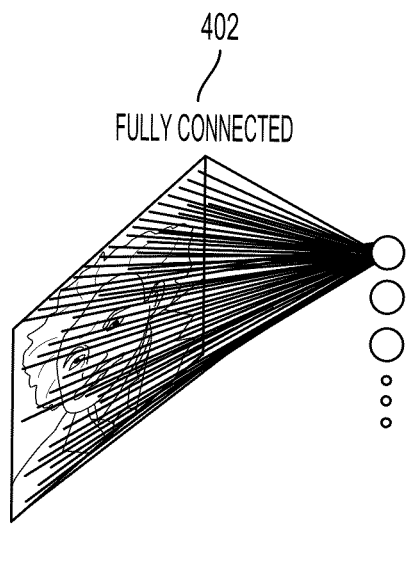
FIGS. 4A, 4B, and 4C are diagrams illustrating a neural network, in accordance with aspects of the present disclosure.
Figure 4B:
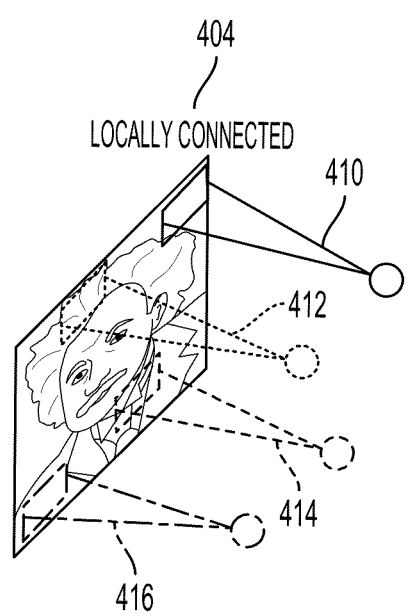

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
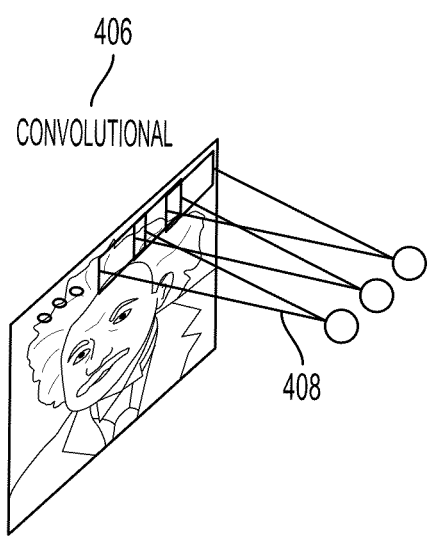

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
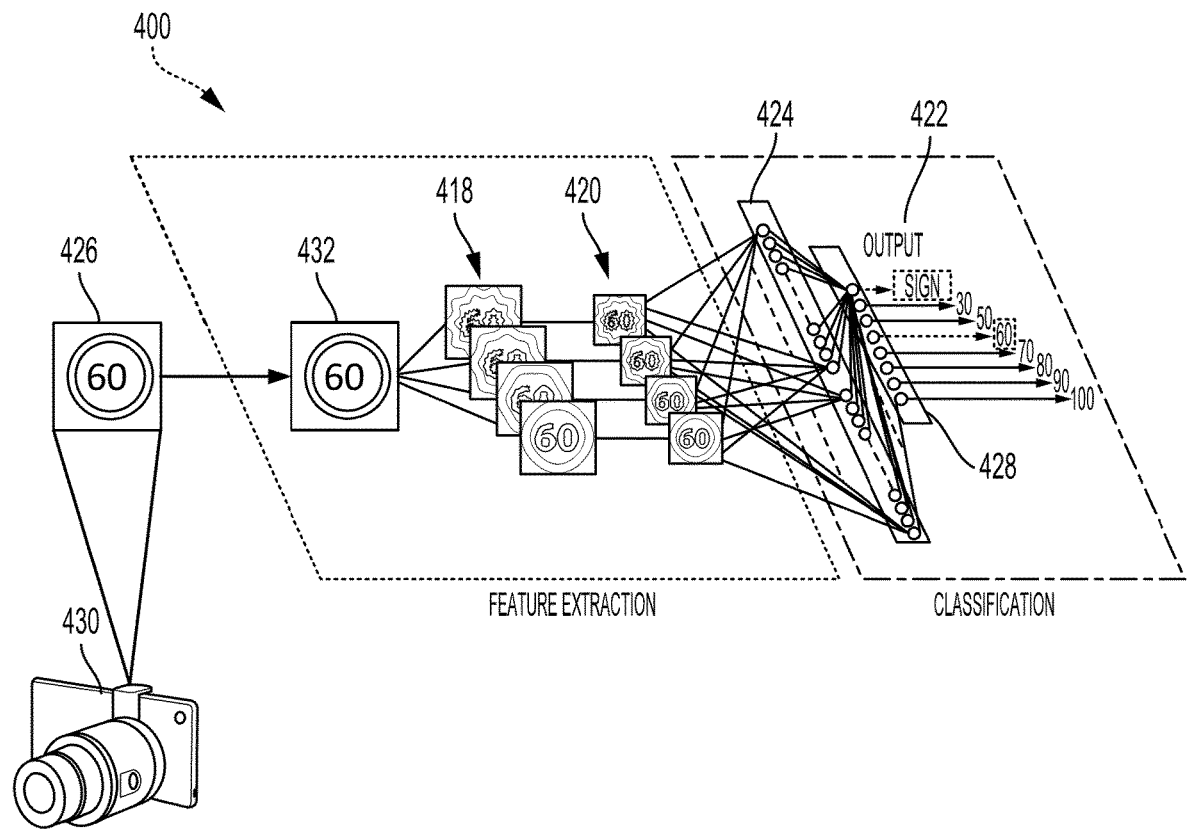
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
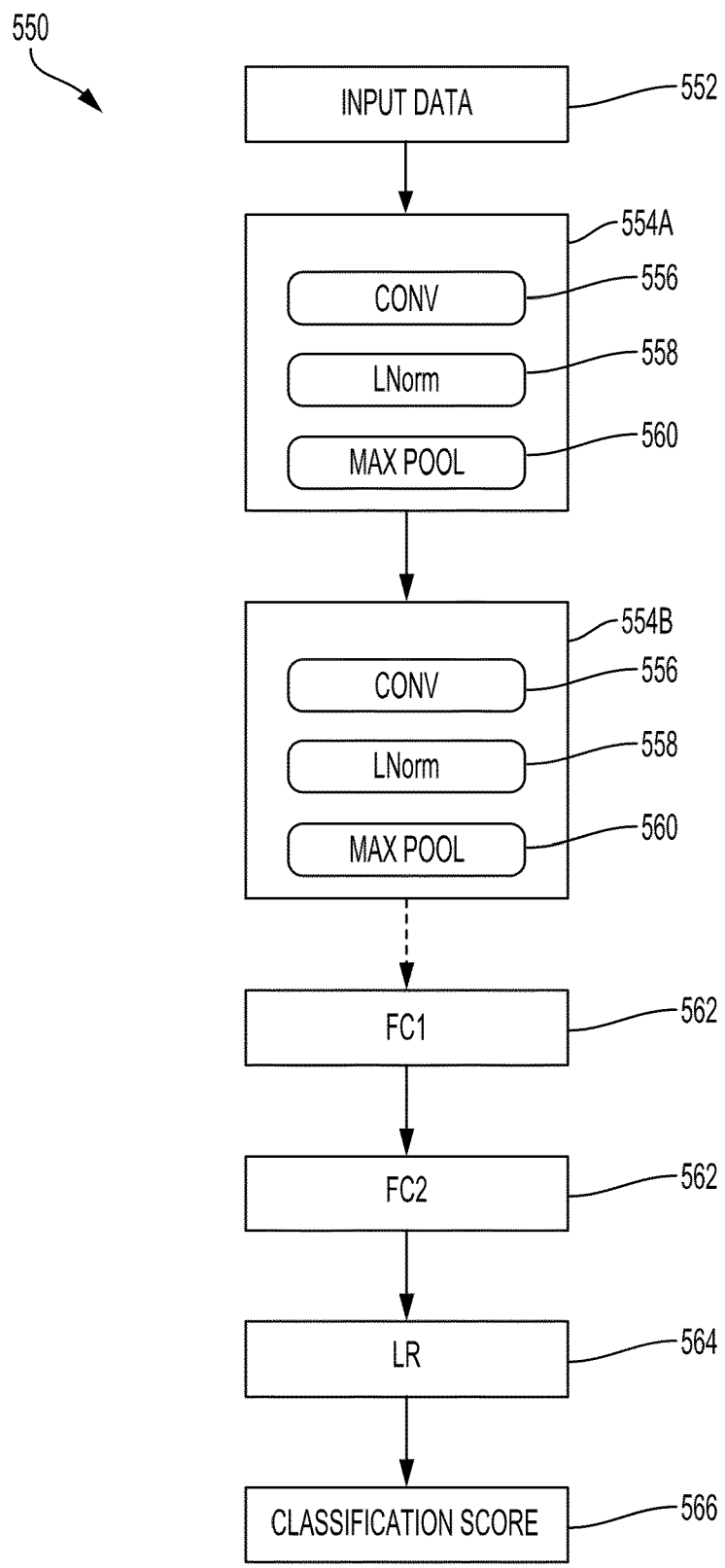
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

Communication standard bodies (e.g., 3GPP) are considering interplay of machine learning (ML) and communications. Training and running machine learning algorithms specifies a large amount of data exchange between different nodes. Dedicated interfaces and signaling may be defined to facilitate machine learning related data exchange. Data can be training data and/or parameters/gradient updates of machine learning modules, for example, in federated learning where parameter updates of machine learning modules are exchanged between nodes. Machine learning modules may be implemented to assist communication functions. For example, machine learning techniques may improve channel prediction and decoding with non-linear impairments. Certain machine learning modules may be implemented on wireless devices, and specify over-the-air signals as input. For example, a machine learning technique to provide accurate positioning may be based on radio frequency (RF) sensing and/or a positioning reference signal (PRS).

In future wireless systems, devices, such as user equipment (UE), may run different machine learning modules for different tasks or purposes. The machine learning module(s) at the user equipment may be configured by network devices such as a gNodeB or central nodes. Configuration may include downloading of parameters from the network or receiving a new algorithm from the network.

Training and refining of machine learning modules can be organized by the network. The training and refining may be centralized, such as when the network collects data from user equipment, and trains the machine learning modules in servers or cloud networks. The training and refining may be distributed, such as when the user equipment compute updates of parameters based on a network configuration, and subsequently report updates to the network.

A machine learning module or a specific configuration of a machine learning module may have a finite range of applicable scenarios. For example, machine learning modules may only work well in scenarios matching the training data sets. Different scenarios or locations may specify training data with different statistics. In one example, a beam selection module may be dependent on location and also time of day.

To handle different scenarios, user equipment may need different machine learning modules or configurations for a specific task. Different machine learning modules may be modules using different types of algorithms. Different machine learning configurations may include different sets of pre-training parameters.

User equipment should know how to select the appropriate machine learning module and when to update the machine learning configuration. User equipment may be configured with a band (or set) of different machine learning modules, and should know when to select the appropriate module to use. In a time-varying environment, user equipment should know when to update the configuration or use a new machine learning module.

According to aspects of the present disclosure, the network may configure a decision making module at a UE to control the parameters and/or selection of the machine learning modules at the UE. The network configures the decision making module, in addition to configuring the machine learning modules at the UE.

The network configures the decision making module to assist the UE to select or adapt machine learning modules. That is, the network transmits to the UE an algorithm or parameters for the algorithm. In some aspects of the present disclosure, the decision making module may implement a reinforcement learning (RL) technique. The input of the decision making module may depend on the gNodeB (e.g., network) sending reference signals, signaling, and/or configurations. The input may correspond to how the environment changes. For example, the UE may use measurements of a channel state information-reference signal (CSI-RS) received from the gNodeB to determine the environment of the UE.

According to aspects of the present disclosure, the UE runs the decision making module locally, and reports to the gNodeB each decision output from the decision making module. As a result, the gNodeB may send, to the UE, a new machine learning module or updated machine learning parameters based on receiving the decision report. The gNodeB may need to know the decision of which machine learning module the user equipment is using, as different machine learning modules may specify different gNodeB configurations or actions. For example, a different configuration of reference signals may be transmitted based on the feedback from the UE.

According to aspects of the present disclosure, the network (e.g., gNodeB) is involved with the training of the decision making module. Thus, data for training is exchanged between the network and UE. For example, the user equipment may feedback sequences of input for the decision making module to make the decision (e.g., state), the resulting decision (e.g., action), and performance resulting from the decision (e.g., reward) to the gNodeB. An example of the reward in the case of a beam prediction module is how accurate beam prediction was, or a difference between a predicted value and an actual value. The network may train the decision making module based on the feedback.

Examples of how aspects of the present disclosure may be implemented are now provided. In a first example, a machine learning module predicts a future gNodeB beam. The predicted beam may be a best beam, such as a beam with a highest signal strength. The gNodeB may configure machine learning modules to enable the UE to predict the future gNodeB beam based on beam measurement from the past. In this example, a machine learning module may be specific to a region (e.g., a cell or a fraction of a cell). A new module or update of parameters is specified if the UE moves towards another region. Moreover, a machine learning module may be specific to a UE moving speed and/or trajectory.

In one scenario, a band of modules are configured at the UE. Each module may be specific to a type of UE mobility. According to aspects of the present disclosure, the decision making module may be configured to instruct the UE on which module to use. The decision making module may use a synchronization signal block (SSB) or channel state information reference signal (CSI-RS) from the gNodeB to estimate Doppler conditions and/or UE speed, and decide the appropriate machine learning module(s) to use based on the estimate. Different machine learning modules (e.g., high speed modules and low speed modules) may specify different configurations of reference signals to measure beams as input. Therefore, the UE may report to the gNodeB the decision from the decision making module.

In another scenario, only a single machine learning module to predict beams is configured at the UE at one time. That is, the UE may only store one model at a time. In this scenario, the decision making module decides when to update the machine learning module configuration. In other words, the decision making module decides whether to replace the machine learning module stored at the UE with another model to be downloaded from the network, or to update the stored machine learning module with new parameters to be downloaded from the network. In this scenario, the decision making module may decide based on a Doppler estimation enabled by a tracking reference signal (TRS) or CSI-RS, and location information based on a positioning reference signal (PRS). When the decision making module decides a new machine learning module is needed, the UE notifies the gNodeB to request the new machine learning module update. Different machine learning modules may also specify different reference signal configurations. A high mobility machine learning module may specify more frequent beam measurements as input, and thus larger time density. For example, a CSI-RS may be specified in addition to an SSB to measure beams.

Another example of how aspects of the present disclosure may be implemented is with respect to a machine learning module for channel estimation based on a demodulation reference signal (DMRS) pilot. In this example, the gNodeB may configure a machine learning module to improve a UE channel estimation based on pilots, in the presence of non-linear impairments. A set of machine learning module parameters may be specific to Doppler, delay spread, and signal-to-noise ratio (SNR), etc., of the channel. The decision making module instructs the UE on how to select the machine learning module parameters based on Doppler, delay, and SNR, etc. of the channel. Different parameters of the machine learning module may specify different pilot patterns. For example, a machine learning configuration for a high Doppler case may specify a smaller time interval between neighboring pilots. If the gNodeB is aware of the selection, the gNodeB may transmit the correct signals. Thus, the UE notifies the gNodeB of the selection of parameters for the machine learning module to enable the gNodeB to use the appropriate pilot pattern.

A third example of an implementation of aspects of the present disclosure is a machine learning module to cancel non-linearity in a receiver. The non-linearity may be a power amplifier non-linearity and phase noise. In this example, the gNodeB may configure a machine learning module to enable a UE to estimate and compensate for the non-linear impairment based on pilots. A decision making module is configured at the UE to determine whether the machine learning compensation should be performed. The decision may be made based on a modulation and coding scheme (MCS) employed, an SNR, or UE power status, for example. The UE reports the decision to the gNodeB, and depending on the decision, the gNodeB will use different downlink pilot signals. For example, the gNodeB may transmit a traditional DMRS if the decision making module decides non-linear compensation is not specified. Otherwise, the gNodeB transmits a new reference signal to enable non-linear compensation, along with the traditional DMRS.

Figure 6:
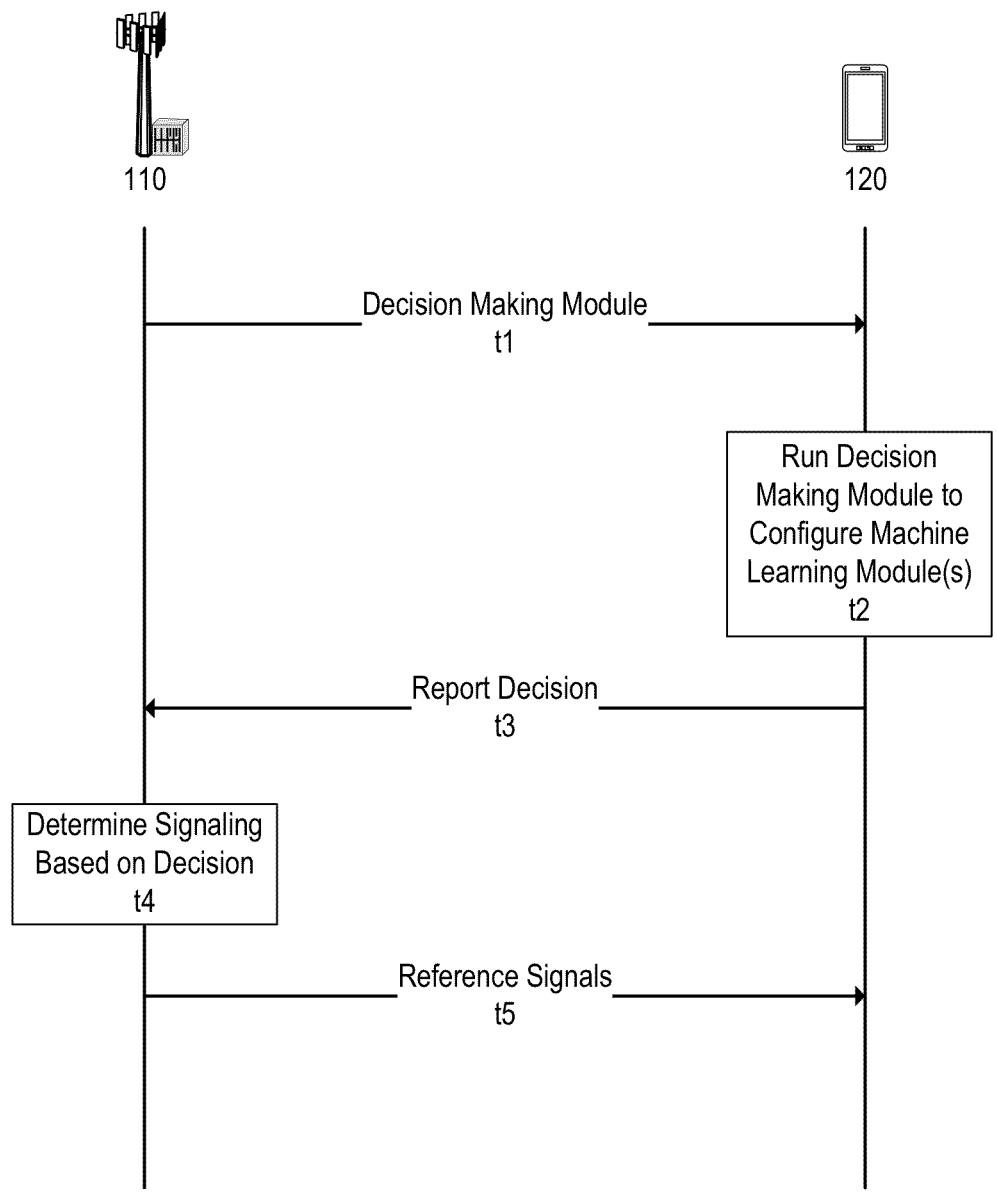
FIG. 6 is a timing diagram illustrating an example process of configuring machine learning modules with a decision making module, in accordance with various aspects of the present disclosure.

FIG. 6 is a timing diagram illustrating an example process of configuring machine learning modules with a decision making module, in accordance with various aspects of the present disclosure. At time t1, a network device 110 (e.g., a base station or gNodeB) transmits a decision making module to a UE 120. At time t2, the UE 120 executes the decision making module to determine a configuration for at least one machine learning module at the UE. The UE 120 reports a decision from the decision making module to the network 110 at time t3. In response to receiving the decision, the network device 110 determines signaling for the UE 120 at time t4. For example, the network device 110 may select a different set of reference signals depending on the decision received from the UE 120. At time t5, the network device 110 transmits the selected set of reference signals to the UE 120.

Figure 7:
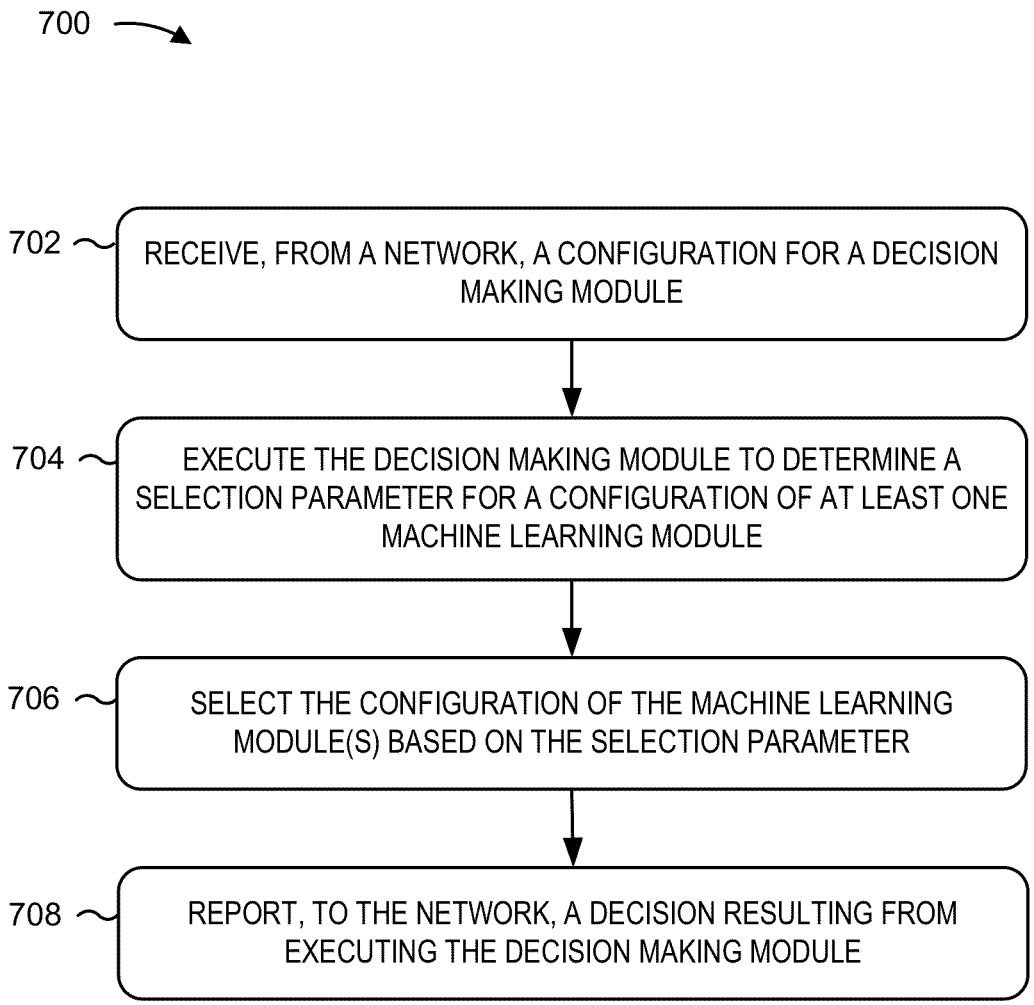
FIG. 7 is a flow diagram illustrating an example process performed, for example, by a user equipment (UE), in accordance with various aspects of the present disclosure.

FIG. 7 is a diagram illustrating an example process 700 performed, for example, by a UE, in accordance with various aspects of the present disclosure. The example process 700 is an example of a cross-node deep learning method of selecting machine learning (ML) modules in wireless communication systems. The operations of the process 700 may be implemented by a UE 120. At block 702, the UE receives, from a network, a configuration for a decision making module. For example, the UE (e.g., using the antenna 252, demodulator (DEMOD) 254, multiple-input and multiple-output (MIMO) detector 256, receive processor 258, controller/processor 280, memory 282, and/or the like) may receive the configuration for the decision making module At block 704, the UE executes the decision making module to determine a selection parameter for a configuration of at least one machine learning module. For example, the UE (e.g., using the controller/processor 280, memory 282, and/or the like) may determine the selection parameter. At block 706, the UE selects the configuration of the at least one machine learning module based on the selection parameter. For example, the UE (e.g., using the controller/processor 280, memory 282, and/or the like) may select the configuration. At block 708, the UE reports, to the network, a decision resulting from executing the decision making module. For example, the UE (e.g., using the antenna 252, modulator (MOD) 254, TX MIMO processor 266, transmit processor 264, controller/processor 280, memory 282, and/or the like) reports the decision.

Figure 8:
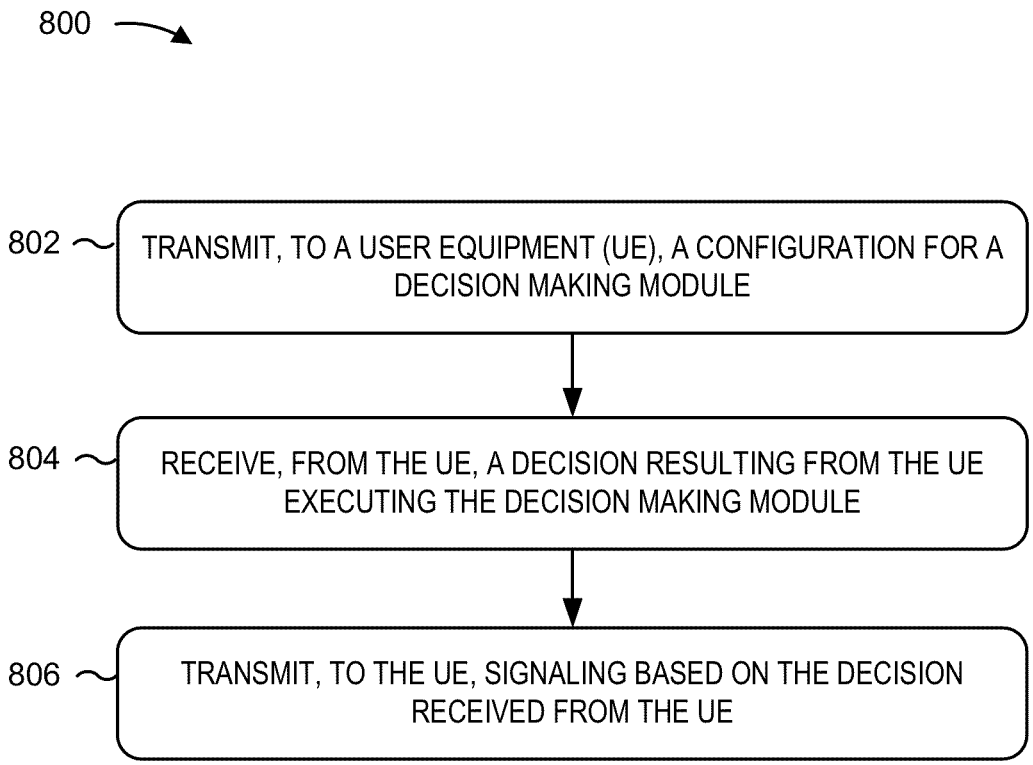
FIG. 8 is a flow diagram illustrating an example process performed, for example, by a network device, in accordance with various aspects of the present disclosure.

FIG. 8 is a flow diagram illustrating an example process 800 performed, for example, by a network device, in accordance with various aspects of the present disclosure. The example process 800 is an example of a cross-node deep learning method of selecting machine learning (ML) modules in wireless communication systems. The operations of the process 800 may be implemented by a base station 110, for example. At block 802, the network device transmits, to a user equipment (UE), a configuration for a decision making module. For example, the network device (e.g., using the antenna 234, MOD 232, TX MIMO processor 230, transmit processor 220, controller/processor 240, memory 242, and/or the like) may transmit the configuration.

At block 804, the network device receives, from the UE, a decision resulting from the UE executing the decision making module. For example, the network device (e.g., using the antenna 234, DEMOD 232, MIMO detector 236, receive processor 238, controller/processor 240, memory 242, and/or the like) may receive the decision. At block 806, the network device also transmits, to the UE, signaling based on the decision received from the UE. For example, the network device (e.g., using the antenna 234, MOD 232, TX MIMO processor 230, transmit processor 220, controller/processor 240, memory 242, and/or the like) may transmit the signal.

Implementation examples are described in the following numbered clauses.

1. A method of wireless communication by a user equipment (UE), comprising:
    receiving, from a network, a configuration for a decision making module;
    executing the decision making module to determine a selection parameter for a configuration of at least one machine learning module;
    selecting the configuration of the at least one machine learning module based on the selection parameter; and
    reporting, to the network, a decision resulting from executing the decision making module.
2. The method of clause 1, in which the reporting further comprises reporting inputs to the decision making module and performance data associated with the decision.
3. The method of any of the proceeding clauses, in which the decision making module comprises a reinforcement learning module.
4. The method of any of the proceeding clauses, in which the configuration of the at least one machine learning module comprises an indication of which of the at least one machine learning module to select.
5. The method of any of the proceeding clauses, in which the configuration of the at least one machine learning module comprises a selection of module parameters for the at least one machine learning module.
6. The method of any of the proceeding clauses, in which the selecting the configuration includes downloading a new machine learning module to replace the at least one machine learning module, or downloading a new set of parameters for the at least one machine learning module.
7. The method of any of the proceeding clauses, in which the configuration of the at least one machine learning module is based on at least one of a location of the UE, channel conditions experienced by the UE, and mobility of the UE.
8. The method of any of the proceeding clauses, further comprising receiving a first set of reference signals in response to the decision having a first value and receiving a second, different set of reference signals in response to the decision having a second, different value.
9. The method of any of the proceeding clauses, further comprising receiving a configuration for the at least one machine learning module.
10. The method of any of the proceeding clauses, in which the executing the decision making module is based on receiving a signal from the network.
11. The method of clause 10, in which the signal from the network comprises a reference signal.
12. The method of any of the proceeding clauses, further comprising executing the at least one machine learning module based on the configuration selected for the at least one machine learning module.
13. A method of wireless communication, by a network device, comprising:
    transmitting, to a user equipment (UE), a configuration for a decision making module;
    receiving, from the UE, a decision resulting from the UE executing the decision making module; and
    transmitting, to the UE, signaling based on the decision received from the UE.
14. The method of clause 13, in which the signaling comprises a first set of reference signals in response to the decision having a first value and a second, different set of reference signals in response to the decision having a second, different value.
15. The method of clause 13 or 14, further comprising:
    requesting the UE to report an input and an output of the decision making module, and performance data associated with the output of the decision making module;

training the decision making module based on the input, the output, and the performance data; and
transmitting, to the UE, updates to the decision making module, based on the training.
16. The method of any of the preceding clauses 13-15, further comprising transmitting, to the UE, a signal for executing the decision making module.
17. The method of clause 16, in which the signal comprises a reference signal.
18. An apparatus for a user equipment (UE) for wireless communication, comprising:
a memory; and
at least one processor coupled to the memory, the at least one processor configured:
to receive, from a network, a configuration for a decision making module;
to execute the decision making module to determine a selection parameter for a configuration of at least one machine learning module;
to select the configuration of the at least one machine learning module based on the selection parameter; and
to report, to the network, a decision resulting from executing the decision making module.
19. The apparatus of clause 18, in which the reporting further comprises reporting inputs to the decision making module and performance data associated with the decision.
20. The apparatus of clauses 18 or 19, in which the decision making module comprises a reinforcement learning module.
21. The apparatus of any of the preceding clauses 18-20, in which the configuration of the at least one machine learning module comprises an indication of which of the at least one machine learning module to select.
22. The apparatus of any of the preceding clauses 18-21, in which the configuration of the at least one machine learning module comprises a selection of module parameters for the at least one machine learning module.
23. The apparatus of any of the preceding clauses 18-22, in which the at least one processor is further configured to select the configuration by downloading a new machine learning module to replace the at least one machine learning module, or downloading a new set of parameters for the at least one machine learning module.
24. The apparatus of any of the preceding clauses 18-23, in which the configuration of the at least one machine learning module is based on at least one of a location of the UE, channel conditions experienced by the UE, and mobility of the UE.
25. The apparatus of any of the preceding clauses 18-24, in which the at least one processor is further configured to receive a first set of reference signals in response to the decision having a first value and receiving a second, different set of reference signals in response to the decision having a second, different value.
26. The apparatus of any of the preceding clauses 18-25, in which the at least one processor is further configured to receive a configuration for the at least one machine learning module.
27. The apparatus of any of the preceding clauses 18-26, in which the at least one processor is further configured to execute the decision making module based on receiving a signal from the network.
28. The apparatus of clause 27, in which the signal from the network comprises a reference signal.
29. The apparatus of any of the preceding clauses 18-28, in which the at least one processor is further configured to execute the at least one machine learning module based on the configuration selected for the at least one machine learning module.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:
1. A method of wireless communication by a user equipment (UE), comprising:

receiving, from a network, a configuration for a decision making module;

executing the decision making module to identify a selection parameter from a plurality of selection parameters for configuring at least one machine learning module at the UE for predicting a future beam for communication with the network;

configuring the at least one machine learning module for predicting the future beam in accordance with the selection parameter; and reporting, to the network, a decision resulting from executing the decision making module.

2. The method of claim 1, wherein the selection parameter enables the UE to predict the future beam in accordance with prior beam measurements.

3. The method of claim 1, wherein the selection parameter corresponds to a region in which the UE operates.

4. The method of claim 1, wherein the at least one machine learning module corresponds to a UE moving speed and/or UE trajectory.

5. The method of claim 1, wherein the at least one machine learning module comprises a plurality of machine learning modules, each corresponding to a type of UE mobility.

6. The method of claim 5, wherein the decision making module estimates a Doppler condition and/or a UE speed in accordance with SSB measurements and/or CSI-RS measurements, in order to identify the selection parameter.

7. The method of claim 1, wherein the at least one machine learning module comprises a single machine learning module, and the selection parameter comprises an updated machine learning module configuration.

8. The method of claim 7, wherein the decision making module estimates a Doppler condition in accordance with at least one of TRS measurements, CSI-RS measurements, and location information associated with a PRS, in order to identify the selection parameter.

9. The method of claim 7, further comprising requesting a model update in response to the decision making module identifying a need for a new machine learning model.

10. The method of claim 7, wherein the selection parameter enables the UE to predict the future beam in accordance with more frequent beam measurements in accordance with the UE having a higher mobility level, and in accordance with less frequent beam measurements in accordance with the UE having a lower mobility level.

11. The method of claim 10, wherein the more frequent beam measurements include CSI-RS measurements and SSB measurements.

12. The method of claim 1, wherein the decision making module comprises a reinforcement learning module.

13. The method of claim 1, further comprising transmitting information to the network for training the decision making module.

14. The method of claim 1, wherein the information comprises input to the decision making module, a decision in accordance with input, and performance resulting from the decision.

15. An apparatus for wireless communication at a user equipment (UE), comprising:

at least one memory; and at least one processor coupled to the at least one memory and configured to receive, from a network, a configuration for a decision making module;

execute the decision making module to identify a selection parameter from a plurality of selection parameters for configuring at least one machine learning module at the UE for predicting a future beam for communication with the network;

configure the at least one machine learning module for predicting the future beam in accordance with the selection parameter; and report, to the network, a decision resulting from executing the decision making module.

16. The apparatus of claim 15, wherein the selection parameter enables the UE to predict the future beam in accordance with prior beam measurements.

17. The apparatus of claim 15, wherein the selection parameter corresponds to a region in which the UE operates.

18. The apparatus of claim 15, wherein the at least one machine learning module corresponds to a UE moving speed and/or UE trajectory.

19. The apparatus of claim 15, wherein the at least one machine learning module comprises a plurality of machine learning modules, each corresponding to a type of UE mobility.

20. The apparatus of claim 19, wherein the decision making module estimates a Doppler condition and/or a UE speed in accordance with SSB measurements and/or CSI-RS measurements, in order to identify the selection parameter.

* * * * *